(12) United States Patent
Johnson et al.

(10) Patent No.: US 7,068,401 B2
(45) Date of Patent: Jun. 27, 2006

(54) OPTICAL SCANNING APPARATUS HAVING A CARRIAGE LOCKING DEVICE

(75) Inventors: Bruce L. Johnson, Eagle, ID (US); William I. Herrmann, Eagle, ID (US); Leonard T. Schroath, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 883 days.

(21) Appl. No.: 10/160,210

(22) Filed: May 31, 2002

(65) Prior Publication Data

US 2003/0231357 A1 Dec. 18, 2003

(51) Int. Cl.
*H04N 1/04* (2006.01)
*H04N 1/40* (2006.01)

(52) U.S. Cl. ...................... 358/474; 358/471; 358/482; 358/483; 358/497

(58) Field of Classification Search ................ 358/497, 358/471, 474, 400, 483, 482, 401, 500, 501, 358/512–514; 250/208.1, 234–236; 399/211, 399/212, 107, 110; 403/322.1; 359/896, 359/196; 74/89.39; 361/726; 292/209, 292/210
See application file for complete search history.

(56) References Cited

U.S. PATENT DOCUMENTS

| | | | |
|---|---|---|---|
| 1,677,210 A | 7/1928 | Rose | 400/663 |
| 2,963,546 A | 12/1960 | Hodne | 178/23 R |
| 4,773,773 A | 9/1988 | Itoh | 400/59 |
| 5,114,252 A | 5/1992 | Tanuma | 400/124.03 |
| 5,119,212 A | 6/1992 | Mori | 358/474 |
| 5,751,431 A | 5/1998 | Taka | 358/296 |
| 5,767,977 A | 6/1998 | Thelen et al. | 358/296 |
| 5,769,515 A | 6/1998 | Chang | 312/223.2 |
| 5,803,622 A | 9/1998 | Mama | 399/4 |
| 5,973,866 A | 10/1999 | Tseng | 359/896 |
| 6,010,204 A | 1/2000 | Morioka | 347/37 |
| 6,247,374 B1 | 6/2001 | Tseng | 74/89.22 |
| 6,402,034 B1 * | 6/2002 | Yeh | 235/472.01 |
| 6,450,727 B1 * | 9/2002 | Lu | 403/322.1 |
| 6,476,373 B1 * | 11/2002 | Gilpin | 250/208.1 |
| 6,529,294 B1 * | 3/2003 | Chang | 358/471 |
| 6,700,717 B1 * | 3/2004 | Lee | 359/896 |
| 6,824,055 B1 * | 11/2004 | Tregoning et al. | 235/454 |
| 6,937,368 B1 * | 8/2005 | Liu | 358/474 |
| 2001/0010582 A1 | 8/2001 | Hayashi | 358/474 |
| 2001/0052914 A1 | 12/2001 | Lee | 347/29 |
| 2002/0015070 A1 | 2/2002 | Taylor | 347/32 |
| 2002/0024553 A1 | 2/2002 | Nishioka | 347/37 |
| 2002/0148945 A1 | 10/2002 | Gilpin | 250/208.1 |
| 2005/0094217 A1 | 5/2005 | Molchan | 358/474 |

FOREIGN PATENT DOCUMENTS

| | | |
|---|---|---|
| DE | 19810878 C1 | 8/1999 |
| JP | 64001573 A | 1/1989 |
| JP | 2068576 A | 3/1990 |
| JP | 05204055 A * | 8/1993 |
| JP | 09289571 A * | 11/1997 |
| JP | 11027462 A | 1/1999 |
| JP | 11027462 A * | 1/1999 |

* cited by examiner

Primary Examiner—Cheukfan Lee

(57) ABSTRACT

An optical scanning apparatus including a chassis having a panel, the panel having an opening defined therethrough. The apparatus has a scanner carriage which is moveably supported within the chassis. A carriage locking device includes an elongated locking member which is moveably disposed within the opening in the panel and, when the locking member is moved in a downward direction within the opening, the locking device secures the scanner carriage in a relatively fixed position with respect to the chassis.

23 Claims, 11 Drawing Sheets

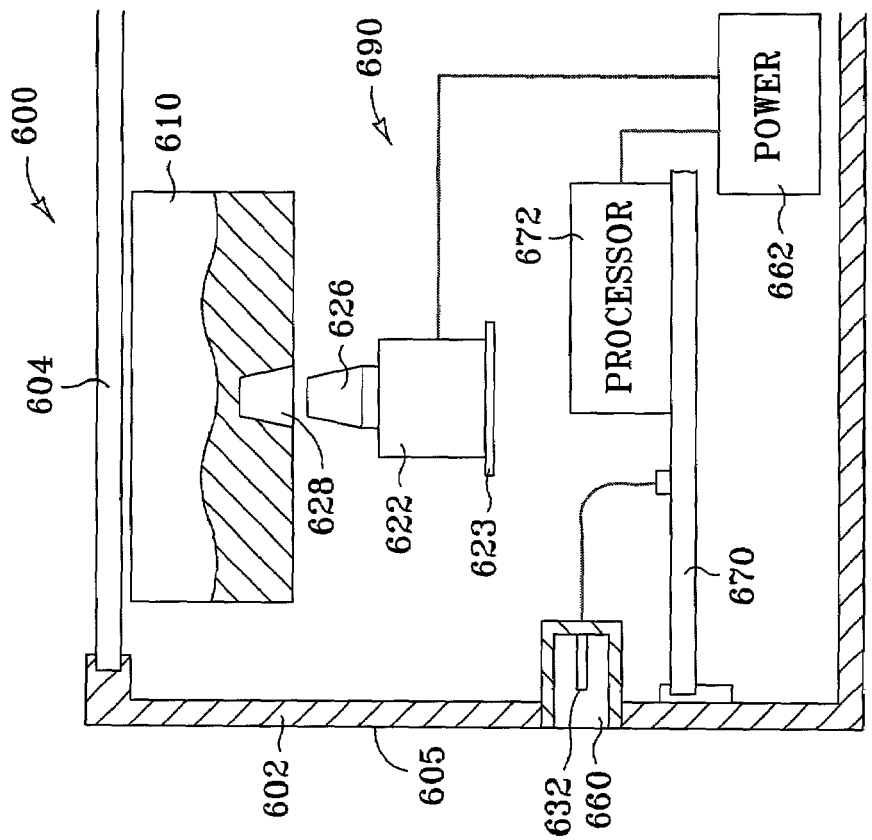
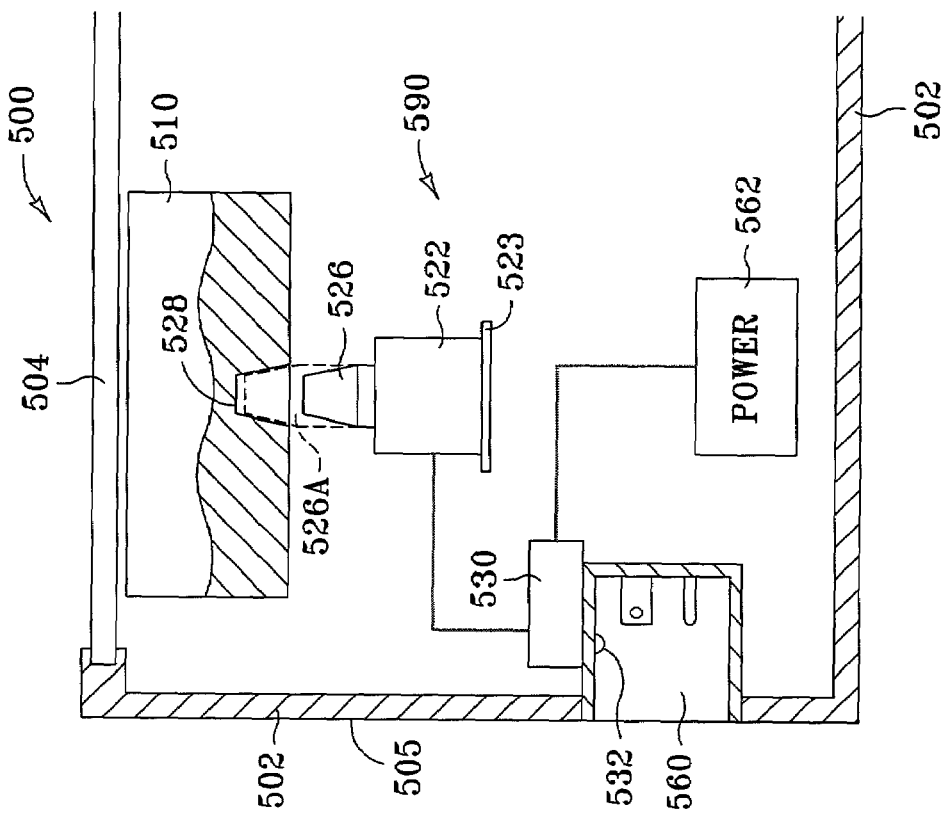
FIG. 14
FIG. 13

OPTICAL SCANNING APPARATUS HAVING A CARRIAGE LOCKING DEVICE

FIELD OF THE INVENTION

The invention claimed and disclosed herein pertains to methods and apparatus for securing an optical scanning carriage within an optical scanning apparatus by use of a carriage locking device.

BACKGROUND OF THE INVENTION

The present invention is directed towards optical scanning apparatus, such as flat-bed scanners, photocopiers and other apparatus, which employ a moveable carriage for performing an optical scanning process. In such scanning apparatus an object to be scanned (i.e., a "scannable object") is typically placed on the upper surface of a flat, transparent platen, and the moveable carriage is moved beneath the platen to thereby optically scan the object. The optical scanning carriage assembly (or "carriage") typically includes the lamp set which is used to illuminate the scannable object, a lens set which is used to focus light reflected from the scannable object, and a sensor array (typically a Charge-Coupled Device, or "CCD") which is used to sense the reflected light. The sensor array generates signals in proportion to the intensity of light reflected by the scannable object, and the signals are used to generate an electronic or latent image of the scannable object.

A number of the components in the scanning carriage assembly are relatively fragile, and can be damaged by mechanical shock and/or vibration. This can occur, for example, during shipping of the optical scanning apparatus, or when the scanning apparatus is moved from one location to another. In order to reduce the chance that the carriage assembly might be damaged, many scanning apparatus are provided with a carriage locking device. Turning to FIG. 1, a prior art carriage locking device is depicted in a side sectional view. The carriage lock depicted in FIG. 1 uses a screw hole "B" which is formed in a side of the scanner carriage "A". A bracket "D" is attached to the chassis "C" of the scanning apparatus. Bracket "D" holds knob "G", which is configured to mate and engage with the screw hole "B" through an external thread "F" on the stem of the knob "G". The stem of the knob "G" passes through the opening "E" formed in the chassis "C" and the bracket "D". A compression spring "H" biases the stem of the knob "G" away from the hole "B" in the carriage "A" when the scanning apparatus is in use (as depicted in FIG. 1). When the scanning apparatus is to be transported, a user pushes the knob "G" leftwards until the end of the stem engages the hole "B". The user then turns the knob "G" until the threaded portion "F" is seated in the hole "B". In one variation the knob "G" is removable from the chassis "C", while in another variation the knob "G" is held to the chassis by a retaining ring "I".

There are a number of disadvantages to the prior art carriage locking devices. Firstly, they require the user to manually engage and disengage the lock. Accordingly, a user may be disinclined to engage the lock when the scanning apparatus is to be moved only a short distance. However, the carriage assembly can still be subjected to mechanical shock during even a short move. Further, when the knob "G" is removable from the chassis "G", then the user may misplace or lose the knob, such that it is not available when needed. On the other hand, if the knob "G" is held to the chassis "C" by a retaining ring, then the protruding knob (as in FIG. 1) presents a potential impact point, and may actually subject the scanning apparatus to an increased risk of experiencing mechanical shock. Further, if the user forgets to release the lock before operation, there is a potential for damage to the scanning mechanism. Even if permanent damage does not occur, the device will not scan properly, which can result in increased support costs.

What is needed then is a scanner carriage locking device which achieves the benefits to be derived from similar prior art devices, but which avoids the shortcomings and detriments individually associated therewith.

SUMMARY OF THE INVENTION

One embodiment of the present invention provides for an optical scanning apparatus including a chassis having a bottom panel, the bottom panel having an opening defined there through. The apparatus has a scanner carriage which is moveably supported within the chassis. A carriage locking device includes a locking member which is moveably disposed within the opening in the bottom panel and, when the locking member is moved in a downward direction within the opening, the locking device secures the scanner carriage in a relatively fixed position with respect to the chassis.

In another embodiment of the present invention an optical scanning apparatus includes a chassis having a side panel, the side panel having a connector opening defined therein. The scanning apparatus has a scanner carriage moveably supported within the chassis. A carriage locking device is actuated when no connector is placed in the connector opening to thereby secure the scanner carriage in a relatively fixed position with respect to the chassis.

These and other aspects and embodiments of the present invention will now be described in detail with reference to the accompanying drawings, wherein:

DESCRIPTION OF THE DRAWINGS

FIG. 13 is a side elevation sectional view depicting yet another carriage locking device.

FIG. 14 is a side elevation sectional view depicting yet another carriage locking device.

DETAILED DESCRIPTION OF THE INVENTION

The present invention provides for a passive scanner carriage locking device as part of an optical scanning apparatus. The locking device is passive in that the lock is automatically actuated or engaged when a user performs an action which indicates that the scanner is being moved or is being taken out of service. In this way, a user does not need to separately secure the scanner carriage to reduce the chance that it will be damaged during a move of the scanning apparatus. Further, the locking device is integral with the scanning apparatus so that it will always be available for use. Additionally, unintended locking of the scanner bar is eliminated when the device is used. Generally, the passive carriage locking device is actuated to secure the scanner carriage when the scanner is put into a configuration which indicates that the scanner is being, or is about to be, moved. Two primary configurations are described herein for a passive scanner carriage locking device. In the first configuration, the locking device is actuated by lifting the scanning apparatus away from a support surface on which the scanner is supported, to thereby secure the scanner carriage in a relatively fixed position with respect to the scanner chassis. In the second configuration, the locking device is actuated by removing a connector from a connector opening defined within the scanner (such as a power connection opening, or a signal communication opening (e.g., a serial port or the like) to thereby secure the scanner carriage in a relatively fixed position with respect to the scanner chassis.

We have described above what we mean by the terms "optical scanning apparatus" (or "scanner")and "optical scanning carriage assembly" ("scanner carriage" or "carriage"). Accordingly, the invention is applicable to any type of optical scanning apparatus which incorporates a scanner carriage that is moveable within the scanner chassis to thereby perform the scanning operation.

Figure 1:
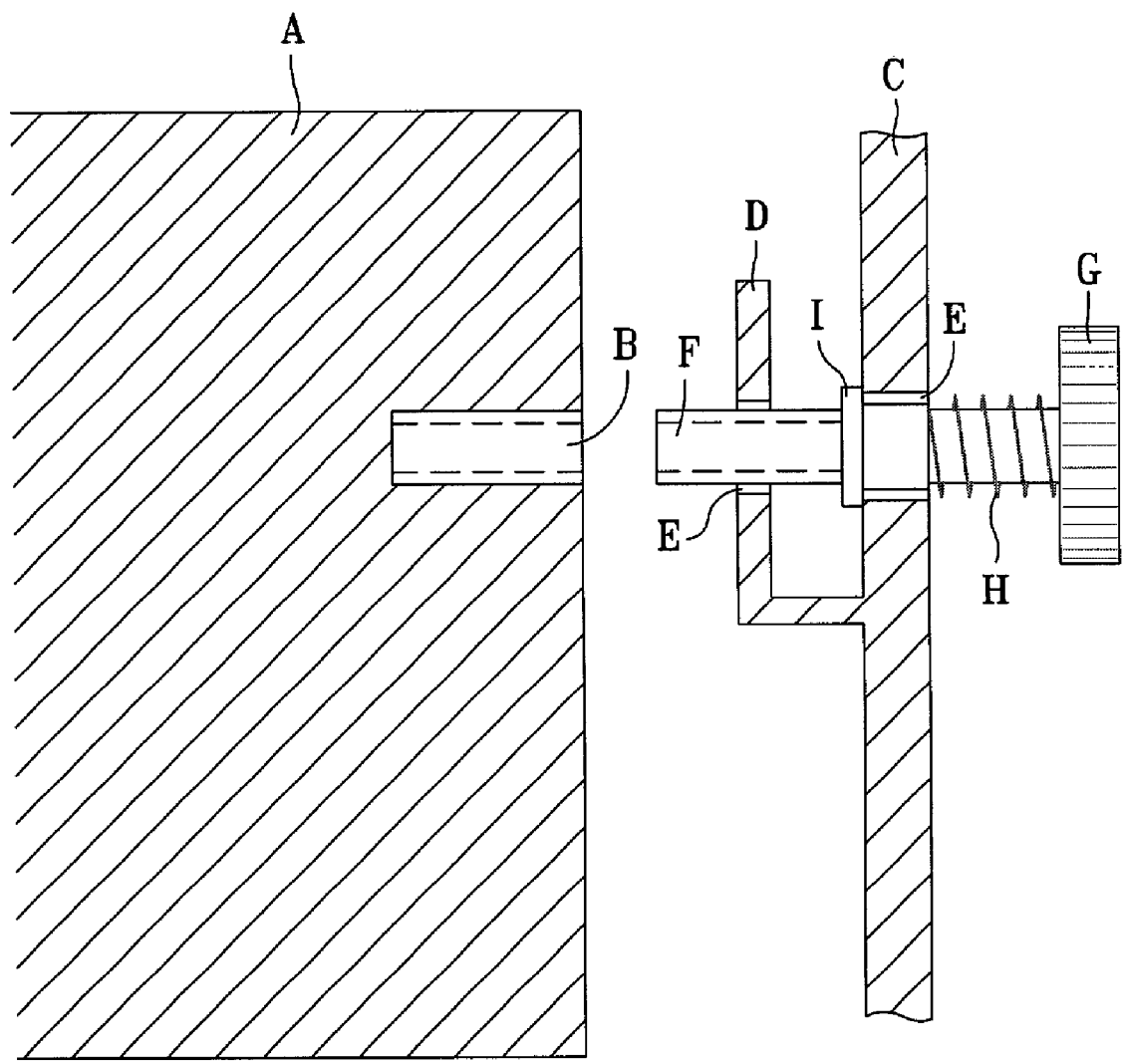
FIG. 1 is a side elevation sectional view of a prior art scanner carriage locking device.
Figure 2:
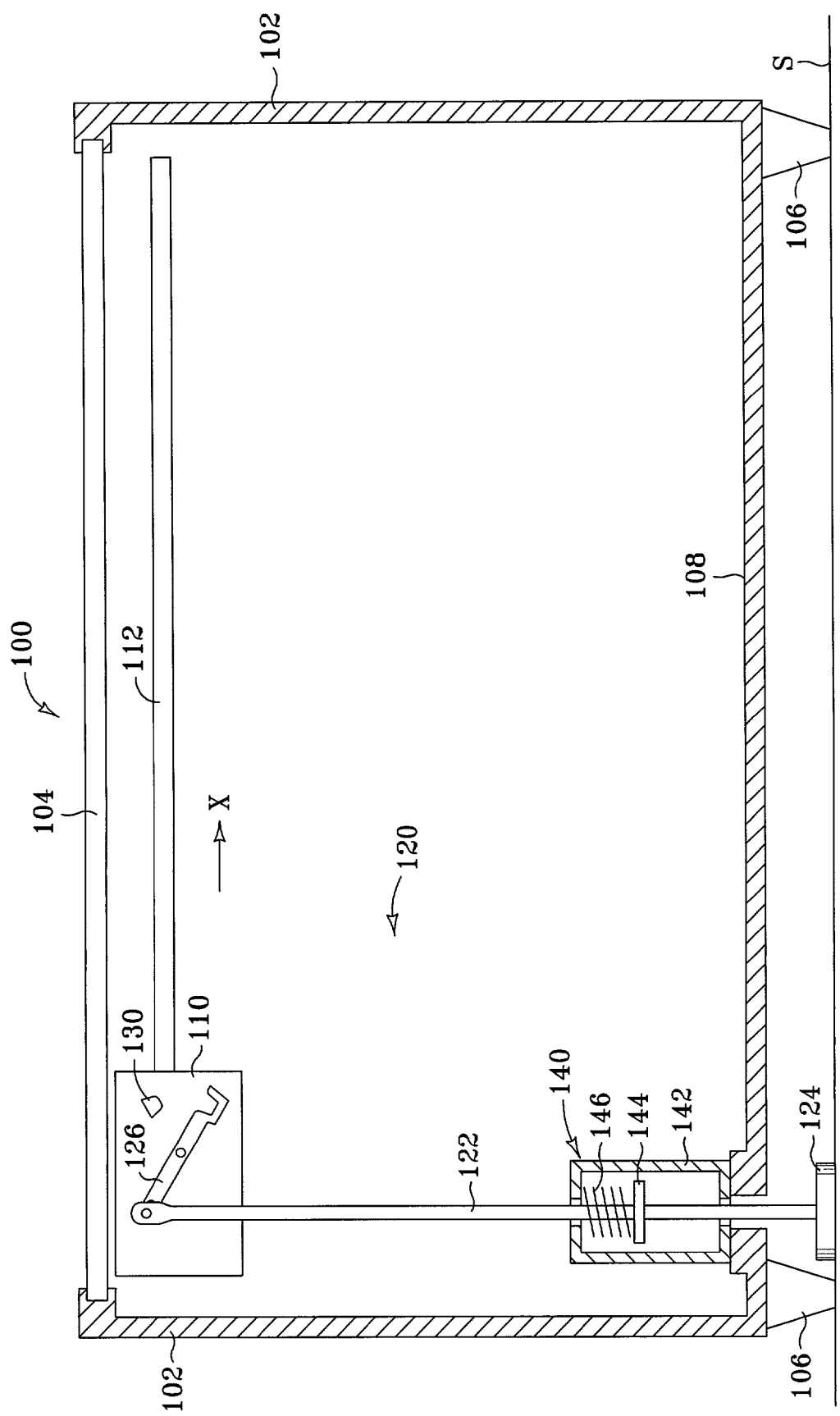
FIG. 2 is a side elevation sectional view depicting an optical scanning apparatus in accordance with the present invention, having a first type of carriage locking device.

Turning to FIG. 2, an optical scanning apparatus 100 in accordance with a first embodiment of the present invention is depicted in a side elevation, sectional view. The scanner 100 is shown resting on a surface "S", such as a table, and supported on the surface "S" by scanner feet 106. The scanner 100 includes a chassis 102 which encloses the main operational components of the scanner. The scanner chassis 102 supports a platen 104, which can be a plate of clear glass or the like, and on which a scannable object can be placed for scanning. The scanner 100 further includes the scanner carriage assembly, or "carriage", 110, which is supported within the chassis 102 by rails or tracks, such as track 112, so that the carriage can move in the direction "X" to thereby scan a scannable object placed on the platen 104. As depicted in FIG. 2, the carriage 110 is in the "at rest" or "home" position, which is the position it is intended to be secured in when the scanner 100 is to be moved.

Figure 3:
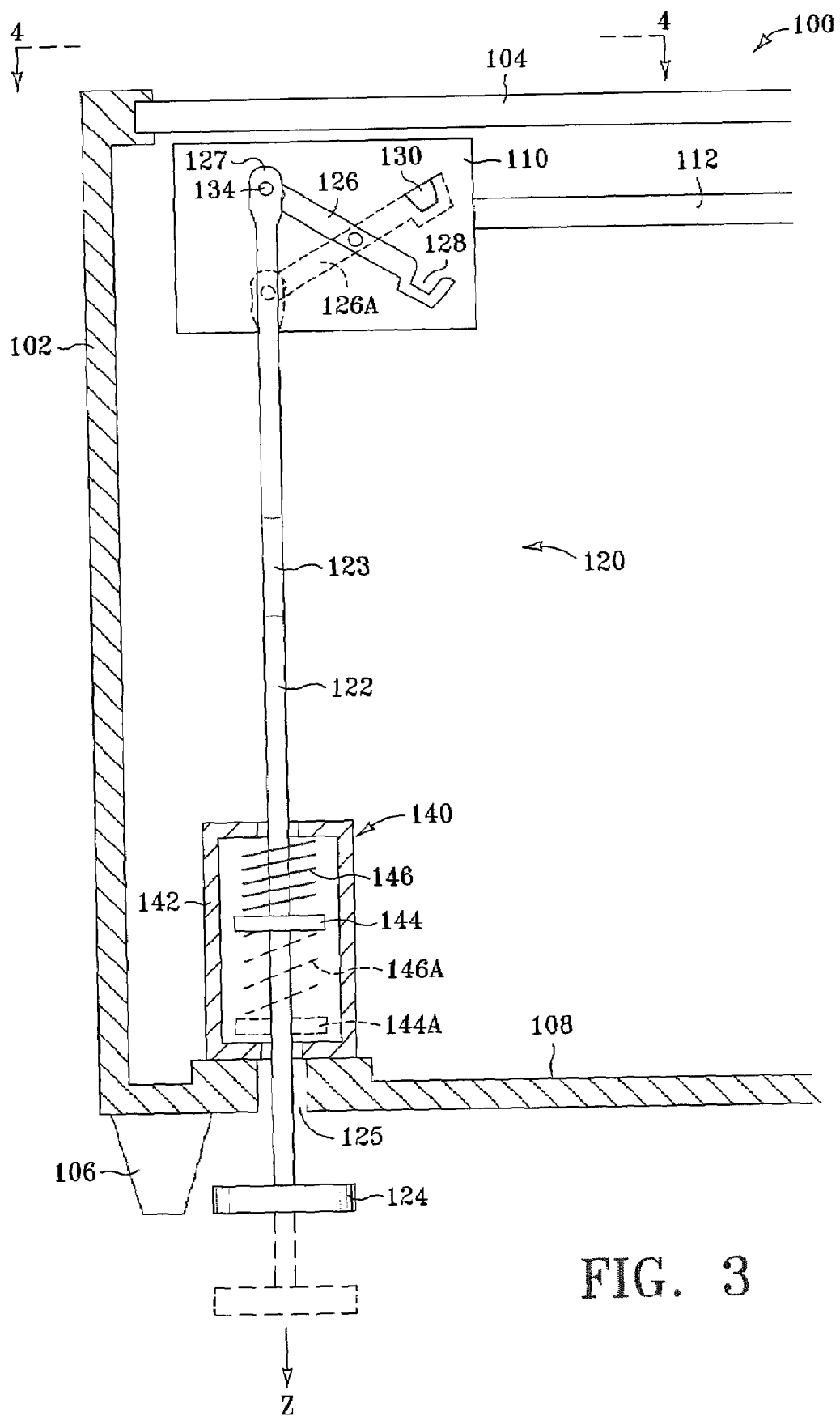
FIG. 3 is a detail of the carriage locking device used in the optical scanning apparatus of FIG. 2.

The scanner 100 further includes a carriage locking device 120, in accordance with the present invention. Turning to FIG. 3, a detail of the left side of the scanner 100 of FIG. 2 is shown, depicting the carriage locking device ("locking device") in detail. The locking device 120 comprises an elongated locking member 122 which is moveably disposed through an opening 125 in the bottom panel 108 of the scanner 100. When moved in a downward direction "Z" within the opening 108, the elongated member 122 will cause the scanner carriage 110 to be secured in a relatively fixed position with respect to the chassis 102 (as will be explained further below). Thus, as the scanner 100 is lifted away from the surface "S", the elongated member 122 will move in direction "Z" to engage the locking device, thus securing the carriage 110 when the printer is lifted for moving. In this way, the locking device 120 can be accurately described as being "passive", since no user involvement is involved other than picking up the scanner 100.

More specifically, the scanner carriage 110 has a locking pin 130 supported thereon. The locking pin 130 is used by the locking device 120 to arrest movement of the carriage 110 with respect to the chassis 102. In addition to the elongated member 122, the carriage locking device 120 further includes a locking lever 126 which is pivotally supported on the chassis 102 by a pivot pin 132. A first end of the locking lever 126 is pivotally connected to a first end 127 of the elongated member 122 by pivot connection 134. A second end 129 of the locking lever 126 is shaped to engage the locking pin 130. Thus, when the elongated member 122 is moved in the downward direction ("Z") within the opening 125 in the bottom panel 108, the shaped end 129 of the locking lever 126 is caused to rotate upward in direction "R", and thus engage the locking pin 130. As shown, the locking pin 130 is shaped to allow the complementary shaped opening 128 of the locking lever 126 to fit over the locking pin 130 with reduced risk of binding.

It will be appreciated that the location of the locking pin 130 and the shaped opening 128 can be reversed, such that the shaped opening is formed in the carriage 110, and the locking pin is mounted on the second end 129 of the locking lever. It will also be appreciated from the drawings that when we refer to a "first end" and a "second end" of the elongated member 122 and the locking lever 126, we do not necessarily mean the end termini of these components, but are merely providing points of reference for orientation of the components. Such will be the practice in the remainder of the discussion, unless stated otherwise.

The terminal end of the elongated member 122 which is outside of the scanner 100 can be provided with a foot 124 to facilitate engagement with the surface "S". Further, the locking device 120 can be provided with a biasing device 140 to bias the elongated member 122 in the downward ("Z") direction. In this way, when the scanner 100 is lifted from the surface "S", actuation of the locking device will be reasonably assured. The biasing device 140 includes a spring member 146, which is shown here as a coil spring disposed about the elongated member 122. The spring 146 is secured within a housing 142, through which the elongated member 122 passes. The elongated member 122 is provided with a fixed collar 144. The spring 146 is thus compressed between the upper surface of the housing 142 and the collar 144 when the elongated member 122 is in the position depicted by solid lines. When the scanner 100 is lifted from the surface "S", the spring 146 will expand to the position indicated by dashed lines as 146A, urging the collar 144 to the position indicated by 144A, thus moving the elongated member 122 in direction "Z". This will in turn cause the locking lever 126 to rotate to position 126A, and thus engage the locking pin 130.

Figure 4:
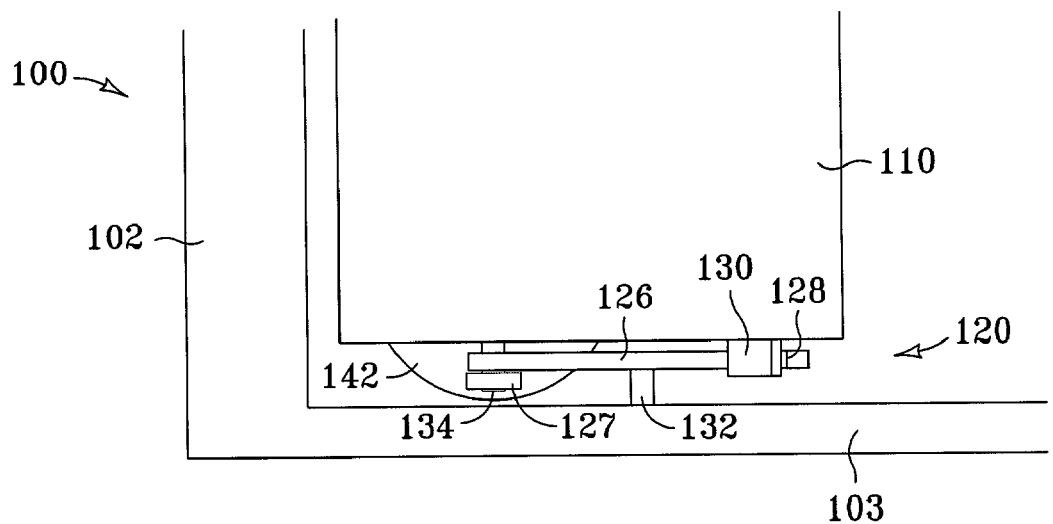
FIG. 4 is a plan view of the carriage locking device depicted in FIG. 3.

The elongated member 122 can have a slight offset section 123, allowing placement of the components of the locking device 120 within the chassis 102. This can be seen by viewing FIG. 4, which is a partial plan view of the scanner 100 of FIGS. 2 and 3, showing how the locking device 120 is placed with respect to the scanner carriage 110 and the chassis 102. As can be seen, the upper end 127 of the elongated member passes in close proximity to the side wall 103 of the scanner 100. This allows the width of the scanner 100 to be maintained at a dimension not much greater than the width of the scanner carriage 110. However, to accommodate the spring housing 142, and to allow the foot 124 (FIG. 3) to be placed within the footprint (i.e., plan view projection) of the scanner 100, the elongated member 122 (not shown in FIG. 4, but shown in FIG. 3) can include the offset section 123 depicted in FIG. 3.

Figure 5:
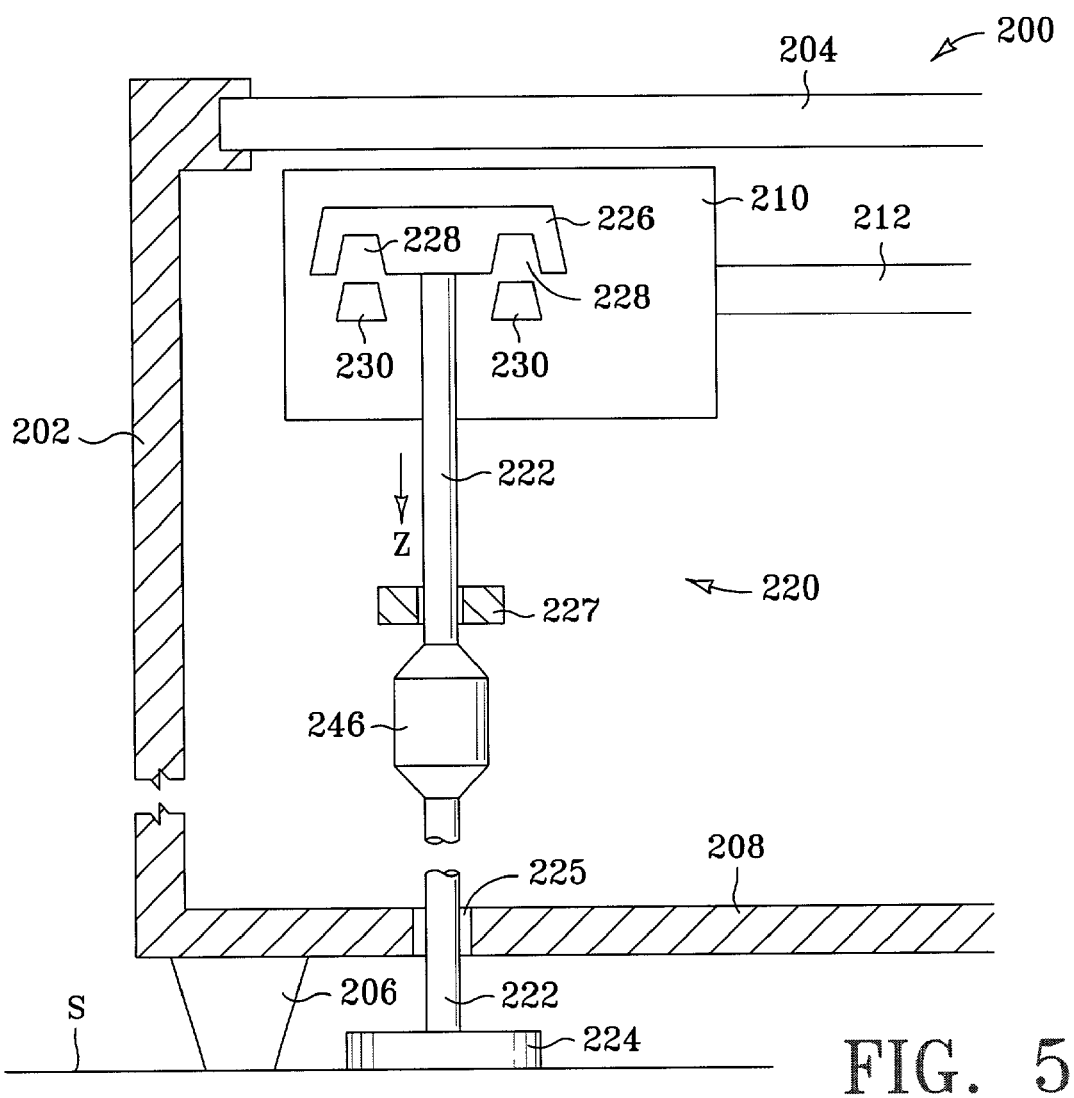
FIG. 5 is a partial side elevation sectional view of another optical scanning apparatus, which incorporates a different carriage locking device than depicted in FIGS. 3 and 4.

Turning now to FIG. 5, a second embodiment of a scanning apparatus 200 in accordance with the present invention is depicted in a partial side, sectional elevation view. The scanner 200 of FIG. 5 is similar to the scanner 100 of FIG. 2 in that scanner 200 includes a chassis 202 having a bottom panel 208, a platen 204, and a scanning carriage 210 which is configured to move along tracks 212 within the chassis 202. Scanner 200 is depicted as being supported on surface "S" by scanner feet 206 (only one of which is shown). The scanner 200 of FIG. 5 differs from the scanner 100 of FIG. 2 in that the scanner 200 includes a different type of carriage locking device than locking device 120 of FIG. 3. Specifically, scanner 200 of FIG. 5 includes locking device 220, which includes an elongated locking member 222. The locking member 222 passes through an opening 225 in the bottom panel 208, and terminates as a locking foot 224. The opposite end of the elongated member 222, which is located within the scanner chassis 202, supports a locking bar 226, which is rigidly affixed to the elongated member 222. The scanner carriage 210 has two locking pins 230 supported thereon, and the locking bar has shaped openings 228 which are configured to receive the locking pins 230 when the elongated member 222 (and thus the locking bar 226) move in the downward direction "Z". As can be seen, locking pins 230 and shaped openings 228 are wedge-shaped so as to facilitate alignment of the openings 228 with the pins 230 when the locking bar 226 moves in the downward direction. The locking bar 226 can also be attached to the locking member 222 by a restricted pivot connection to facilitate engagement of the locking bar 226 with locking pins 230. The locking device 220 can also include a guide 227 for the elongated locking member 222. The guide 227 is attached to the chassis 202, and allows the elongated member 222 to slide within the guide 227, but restrains lateral movement of the elongated member, thus facilitating alignment of the openings 228 with the pins 230 when the elongated member 222 moves in the downward direction "Z". The use of a plurality of locking pins 230 can provide additional locking capability for the locking device 220 over the single-pin design depicted in FIG. 3.

Although FIGS. 2 and 5 suggest that the respective scanning apparatus 100 and 200 have only a single locking device, in fact a separate locking device can be provided at each side of the scanning carriage (110, 210). Such an arrangement can help to further restrict movement of the scanner carriage within the scanner chassis when the locking devices are engaged.

The scanner 200 also includes a biasing device to bias the elongated member 222 in the downward ("Z") direction, achieving a similar result as the biasing device 140 described above with respect to FIG. 3. The biasing device used in scanner 200 of FIG. 5 includes a weight 246 which is supported on the elongated member 222. The weight helps to urge the elongated member 222 in the downward "Z" direction when the scanner 200 is lifted away from the surface "S".

Figure 6:
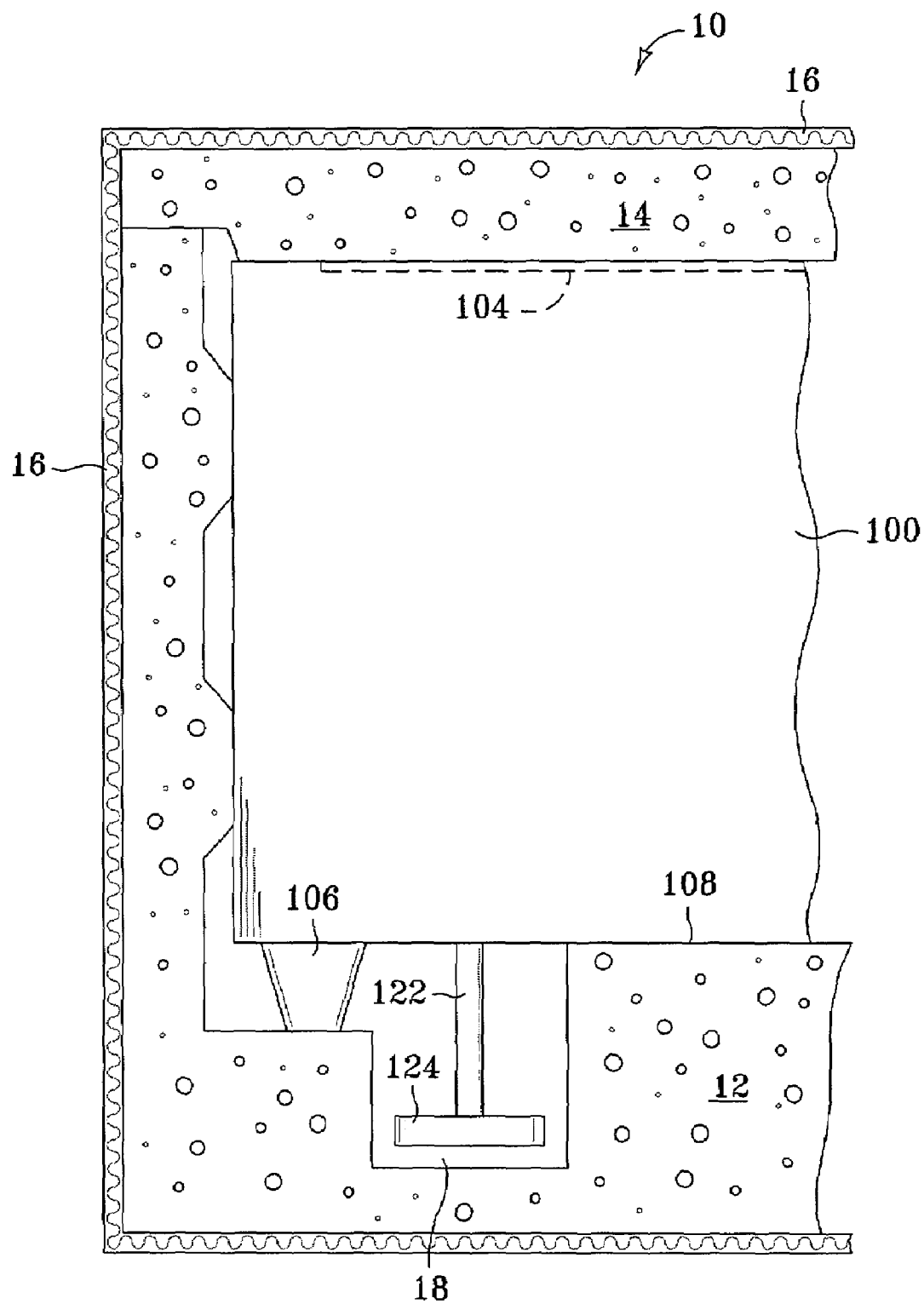
FIG. 6 is a partial side elevation view of the optical scanning apparatus of FIG. 5, depicting the apparatus as packaged for shipping.

Turning now to FIG. 6, a side elevation sectional view of a packaged scanner 10 is depicted. The packaged scanner 10 includes the scanner 100 of FIG. 2 (which can also be the scanner 200 of FIG. 5), which is placed in a shipping carton 16. Placed between the scanner 100 and the inner walls of the carton 16 is a cradle 12, which can be made from rigid foam such as Styrofoam® (available from the Down Chemical Company of Midland, Mich.) or other similar materials, including cardboard. The cradle 12 supports the scanner 100 by the scanner feet 106 (only one of which is shown) and the bottom panel 108 of the scanner. A top core 14 (which can also be made of a rigid foam material) is placed over the platen 104. Formed in the cradle 12 is a void area 18 which is shaped to receive the foot 124 of the locking device 120 (FIG. 3) and the portion of the elongated member 122 which protrudes beyond the bottom panel 108 of the scanner 100. As can be seen, the void area 18 allows the elongated member 122 to project the locking foot 124 beyond the scanner foot 106. This allows the locking device (120, FIG. 3) to secure the scanner carriage (110, FIG. 3) in a relatively fixed position with respect to the scanner chassis (102), as depicted by the dashed lines in FIG. 3. In this way, a scanner carriage can be securely locked in position for shipment of the scanner without requiring the person who is packing the scanner to take any steps beyond merely placing the scanner in the cradle 12.

Although the elongated members 122 and 222 of FIGS. 3 and 5 are depicted as being relatively long in length, they only need to be of sufficient length to allow the elongated member to project a sufficient distance beyond the bottom panel (108, 208) of the scanner (100, 200) to actuate the locking device (120, 220), as depicted in FIG. 6. Accordingly, the "elongated locking member" of the locking device can in fact be relatively short dimensionally. Further, while the elongated members 122 and 222 are depicted as being shaft-like in shape, they can also be of other shapes, such as flat plates or compound shapes. Thus, the elongated members 122 and 222 can properly be termed "locking actuation members" since they cause the locking devices (120, 220) to be actuated, as described above.

Figure 7:
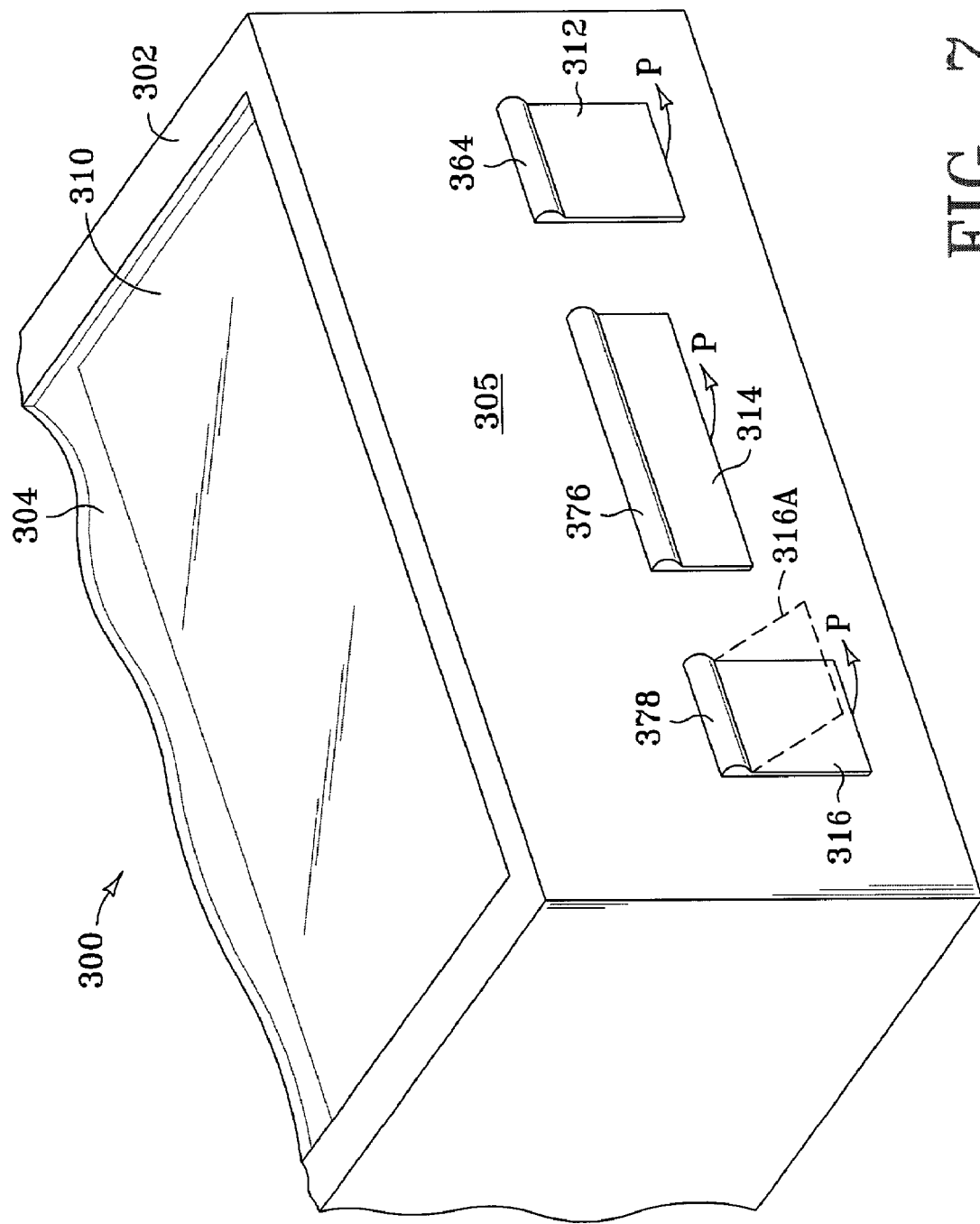
FIG. 7 is a partial isometric view of the back panel of an optical scanning apparatus.

Turning now to FIG. 7, an optical scanning apparatus 300 in accordance with a third embodiment of the present invention is depicted in an isometric view. The scanner 300 includes a chassis 302 which supports a platen 304 and a scanner carriage 310 which can move on track or rail (not shown), much in the manner of scanner 100 of FIG. 2. The scanner 300 has a side panel 305 which has a plurality of connector openings defined therein. In FIG. 7, the connector openings are not visible, since each of the connector openings is covered by respective covers 312, 314, 316 which are supported on the side panel 305 by respective hinges 364, 376 and 378. The different connector openings can be configured to receive, for example, an electrical power connector or a signal connector. Examples of a signal connector include a parallel cable connector, and a universal serial bus ("USB") connector. In the case of the parallel cable connector opening and the USB connector opening, these openings can be termed respectively "a parallel port" and "a USB port" or "serial port". For illustrative purposes, let us assume that cover 312 covers an electrical power connector opening, cover 314 covers a parallel port, and cover 316 covers a USB port. Each of the covers 312, 314 and 316 are moveable (as in direction "P") from a first position wherein the connector opening is exposed (as illustrated, for example, by the cover 316A in dashed lines), to a second position wherein the connector opening is covered (as shown in solid lines for the three covers).

As will be more fully described below, the scanning apparatus 300 further includes a carriage locking device (not shown in FIG. 7) which is actuated by at least one of the covers 312, 314 and 316 and which secures the scanner carriage 310 in a relatively fixed position with respect to the chassis 302 when the cover is in the second (or "down") position (i.e., the position depicted by solid lines in FIG. 7). That is, when selected covers are placed in the second or closed position, the locking device will be actuated to secure the scanner carriage 310 within the scanner chassis 302. For example, in one variation only the power connector opening can be provided with a cover which actuates the locking device. Thus, when a user disconnects the power cord from the scanner (suggesting that the scanner is about to be moved), the cover 312 for the power connection opening will close, thereby actuating the locking device. In another variation, if the scanner is provided with only a single signal connector opening (such as a parallel port), then removing the parallel cable from the parallel port will cause the cover 314 to move to the second (or closed) position, thereby actuating the locking device. In yet another variation, the locking device can be configured such that closing the cover on either the signal connector opening or the power connector opening will engage the locking device. Alternately, the locking device can be configured so that both the signal connector opening cover 314 and the power connector opening cover 312 must be closed in order for the locking device to engage the scanner carriage.

Further below, we will describe an implementation for yet another variation. In this latter variation, covering either the power connection opening, or both of the parallel port and the USB port, will cause the locking device to engage the scanner carriage locking device. This last variation is particularly useful since, in practice, a user will rarely have both a parallel connection and a USB connection to the same scanning apparatus, even though both a parallel port and a USB port may be provided. That is, while the scanner is in operation (and the carriage should not be locked in position), one or the other of the signal ports may be covered, yet the carriage should be free to move. It is only when both of the signal connector openings are covered that the locking device should be engaged to secure the carriage. Accordingly, the locking device is preferably configured such that the scanner carriage is only secured when both of the signal ports are covered, or when the power connection opening is covered. That is, covering either the power connection opening, or both of the signal connector openings, indicates that the scanning apparatus is about to be moved, thus justifying locking the carriage in position.

Figure 8:
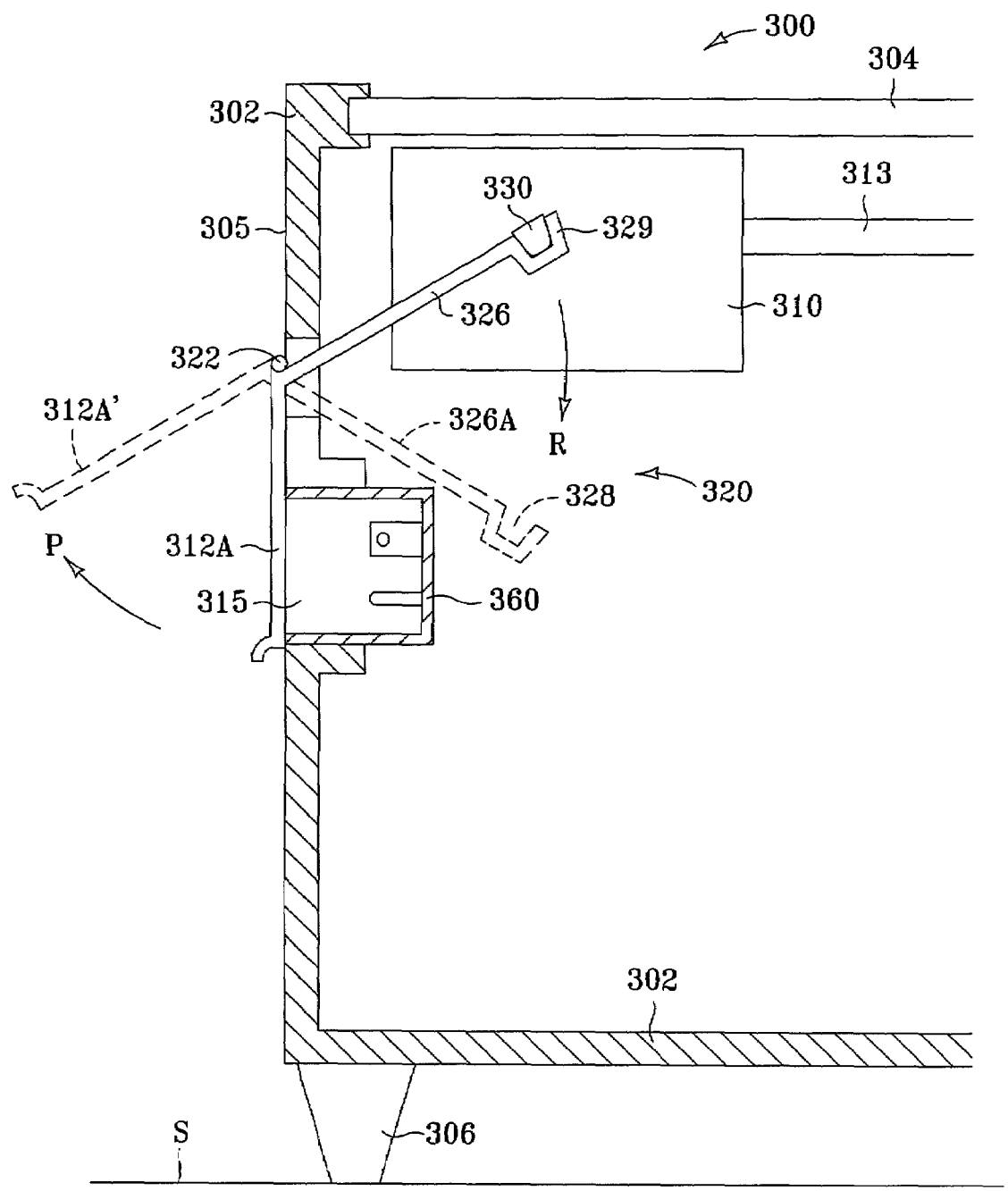
FIG. 8 is a partial side elevation sectional view of a scanning apparatus, depicting another type of carriage locking device.

Turning now to FIG. 8, an implementation of a carriage locking device 320 which is actuated by covering a connector opening in a side panel of an optical scanning apparatus is depicted. Scanner 300 of FIG. 8 is depicted in a partial, side elevation sectional view. The scanner 300 is similar to the scanner 300 of FIG. 7 in that it includes a chassis 302, platen 304, scanner carriage 310 which travels on scanner rail 313, and side panel 305. The scanner 300 is configured to rest on surface "S", supported by scanner feet 306 (only one of which is shown). In this view, a connector opening 315 is depicted as a power connector opening, allowing a power cord to be secured in power plug housing 360. Cover 312A is supported by hinge 322 on the side panel 305 of the scanner 300, and covers the connector opening 315 when no connector is placed in the opening. The hinge 322 can be provided with a biasing element (not shown), such as a spring, to bias the cover 312A to the closed position (as shown). The scanner carriage 310 has a locking pin 330 supported thereon, much like the locking pin 130 described above with respect to scanner 100 of FIG. 3. In the embodiment depicted in FIG. 7, the carriage locking device 320 comprises a locking arm 326 having a first end connected to the cover 312A, and a second end 329 which is shaped to engage the locking pin 330 when the cover 312A is in the closed or second position, such as depicted by solid lines in FIG. 8. Movement of the cover 312A in direction "P" to the first or "open" position, depicted by 312A' (indicating that a power connector is, or is about to be, placed in the connector opening 315), causes the locking arm 326 to rotate in direction "R" to the position indicated by dashed lines 326A, thereby disengaging the locking pin 330 and allowing the carriage 310 to able to move.

Figure 9:
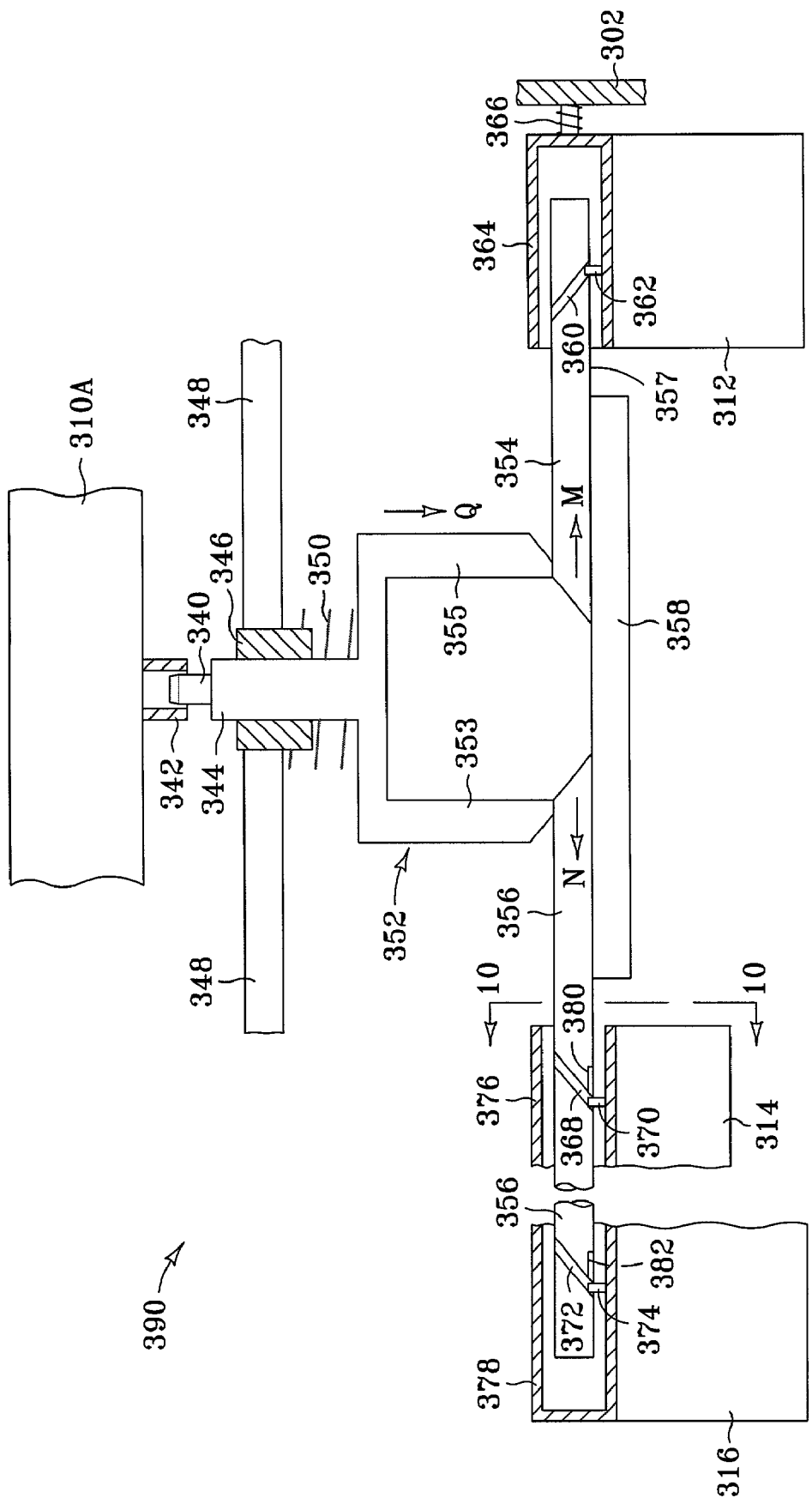
FIG. 9 is an end view of the carriage locking device used in the optical scanning apparatus of FIG. 7, showing the carriage locking device in the locked position.

We will now describe the embodiment of the locking device mentioned above. In this embodiment, the locking device is actuated to secure the scanner carriage by either (1) placing the power connector opening cover ("first cover") in the closed (or "second") position, or (2) by placing both covers (second and third covers) for two signal connector openings (e.g., a parallel port and a USB port) in the closed or "second" position. Turning to FIG. 9, an end view of a locking device actuator 390 which can be used for the optical scanning apparatus 300 of FIG. 7 is depicted. FIG. 9 depicts the locking device 390 as locking the carriage 310 in relatively secure position, and FIG. 9A (discussed further below) depicts the locking device in the unlocked position. The actuator for the locking device 390 includes a locking arm 352 which terminates in a locking pin 340. The locking pin 340 is configured to be received within a receptacle 342 which is in turn supported on the carriage 310. In the position shown, the locking pin 340 thus secures the carriage 310 in a relatively fixed position with respect to the chassis 302. The locking arm 352 is actuated (to engage or lock the carriage 310) by a pair of locking actuators 354 and 356, either of which is sufficient to actuate the locking arm. Locking actuator 354 is actuated when the first cover 312, which covers a power connection opening, is in the closed or second position; locking actuator 356 is actuated when both of a second cover 314 (which can cover a serial port) and a third cover 316 (which can cover a USB port) are placed in the closed or second position. Actuation of both locking actuators 354 and 356 allow the locking arm to move in direction "Q", thus unlocking the carriage 310.

Figure 9A:
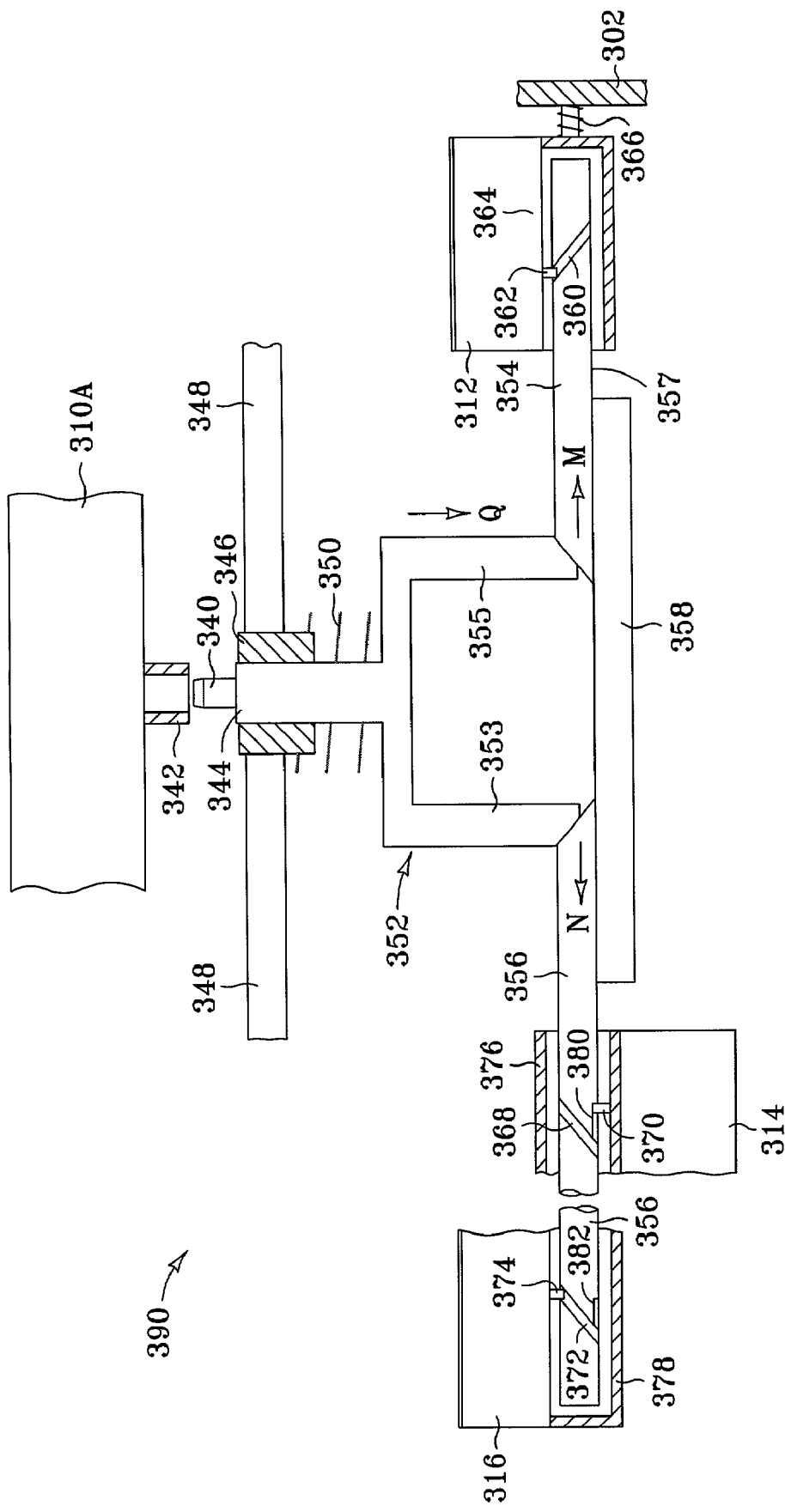
FIG. 9A depicts the carriage locking device of FIG. 9 with the carriage locking device in the unlocked position.

More specifically, each of the covers 312, 314 and 316 are supported by the chassis 302 by respective hollow cylindrical hinges 364, 376 and 378. Locking actuator 354 is received within hinge 364, and locking actuator 356 is received within hinges 376 and 378. Support 358 allows the actuators 354 and 356 to move slidably in directions "M" and "N". Hinge 364 has a tab 362 located on the inside of the hinge, and which is received within an angled slot 360 in the actuator 354. In this way, when the cover 312 is rotated to the first or open position (out of the page and away from the position shown in FIG. 9 to the position shown in FIG. 9A), tab 362 causes the actuator 354 to be moved in direction "M", and out from under leg 355 of the locking arm 352. However, the locking arm, which is biased downward in direction "Q" by spring 350, will not move, since actuator 356 is still under the left leg 353 of the locking arm (as depicted in FIG. 9). Hinges 376 and 378 have respective tabs 370 and 374 located on the inside of the hinges. Tabs 370 and 374 are received within respective angled slots 368 and 372 in the locking actuator 356. In this way, when either cover 314 or 316 is rotated to the first or open position (out of the page and away from the position shown in FIG. 9), tabs 370 and 374 will cause the actuator 356 to be moved in direction "N", and out from under leg 353 of the locking arm 352. An example of this is depicted in FIG. 9A, wherein cover 316 has been moved to the open position, causing actuator 356 to move out from under the left leg 353. Thus, once actuators 354 and 356 have both moved out from under respective legs 355 and 353 (as depicted in FIG. 9A), the locking arm 352 is then free to move in direction "Q". A collar 346, which is supported by bracket 348, keeps the locking arm 352 from cocking when only one of the actuators 354 or 356 has been retracted. Each of the locking actuators 354 and 356 has a slanted end, so that when the actuators move back to the position shown they will be able to lift the locking arm 352 back into the position shown. Likewise, legs 353 and 355 can be provided with slanted ends to facilitate sliding of the actuators 354 and 356 back to the position depicted in FIG. 9. Preferably, each of the hinges 364, 376 and 378 are provided with a spring or the like (such as spring 366) which biases the covers 312, 314 and 316 into the closed position (as in FIG. 9).

Figure 10:
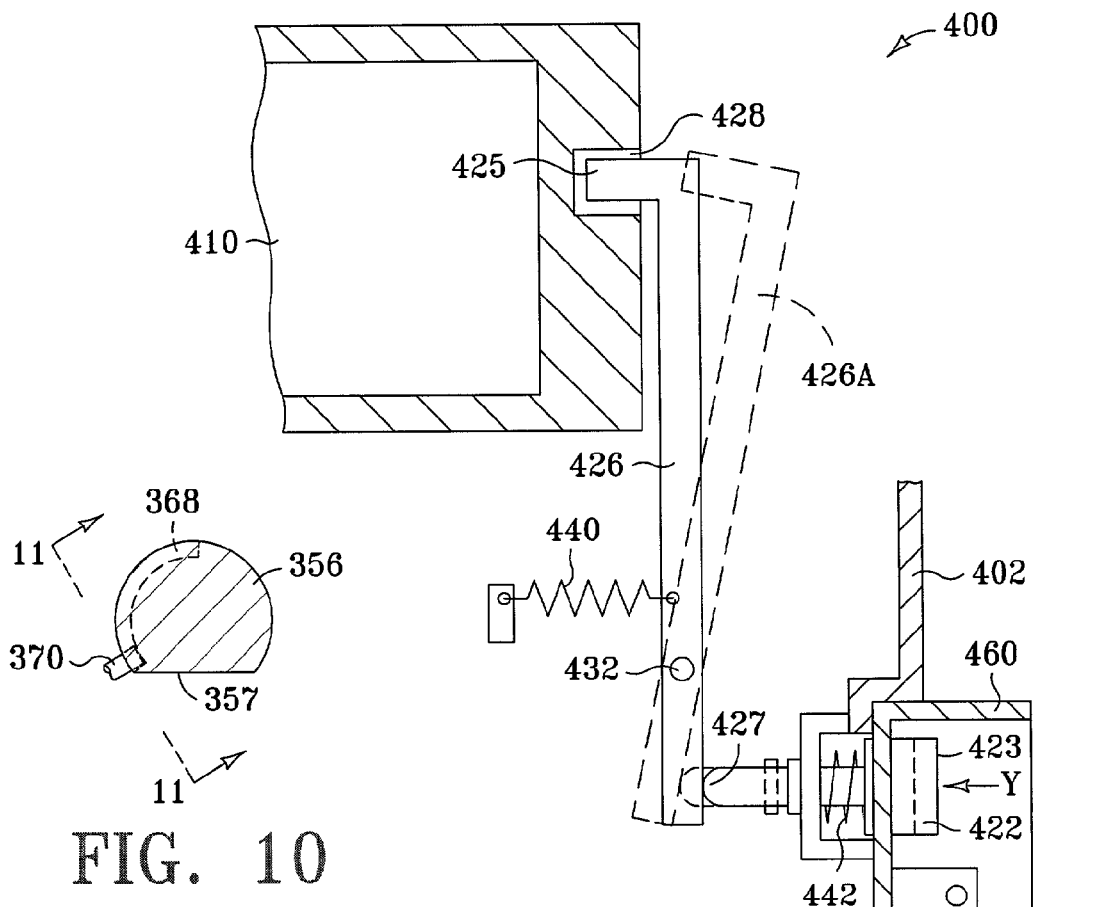
FIG. 10 is a cross sectional view of a carriage locking actuator used in the locking device of FIG. 9.
Figure 11:
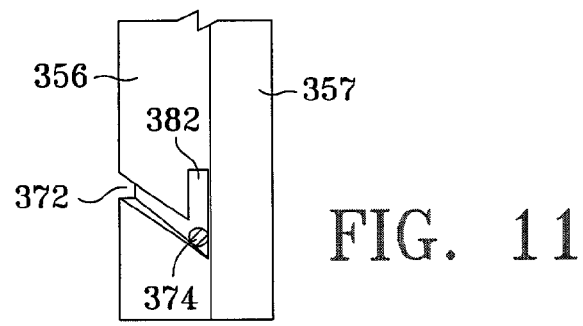
FIG. 11 is a bottom view of the carriage locking actuator depicted in FIG. 10.

Turning to FIG. 10, a cross section of actuator 356 is depicted. The actuator 356 is generally cylindrical to accommodate the rotary motion of tabs 370 and 374 as respective covers 314 and 316 are opened. The actuator 356 further has a flat surface 357 allowing it to slide along support 358. FIG. 10 shows how tab 370 from cover 314 can fit within slot 368. Turning to FIG. 11, a bottom-side view of actuator 356 is shown. As can be seen, the bottom surface 357 has two elongated slots 380 and 382 formed therein, and which intercept the respective angled slots 368 and 372. The elongated slots 380 and 382 allow the actuator 356 to move with respect to a non-acting tab (either tab 370 or 374). By a "non-acting tab" we mean a tab that is not being used to actuate the actuator. For example, if cover 316 is opened, then tab 374 will be the acting tab, and will cause the actuator 356 to move in direction "N" (see FIG. 9A). However, since cover 314 is not being opened, tab 370 will be non-acting. Thus, as depicted in FIG. 9A, slot 380 allows the actuator 356 to move in direction "N" without binding on tab 370, or forcing cover 314 into the open position.

Figure 12:
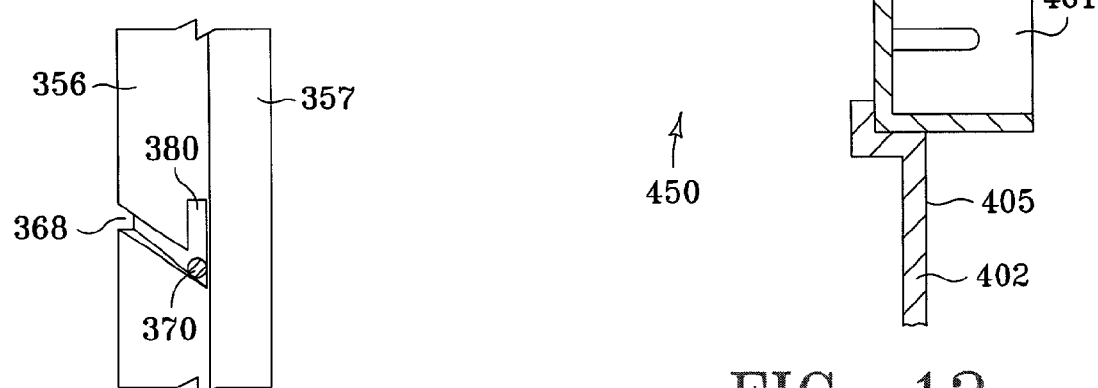
FIG. 12 is a side elevation sectional view depicting another carriage locking device.

Turning now to FIG. 12, another type of carriage locking device is depicted which is actuated when no connector is placed in the connector opening, to thereby secure the scanner carriage in a relatively fixed position with respect to the chassis. FIG. 12 depicts a partial, side elevation, sectional view of an optical scanning apparatus 400. The scanner 400 has a scanner carriage 410 which is configured to move in the direction into the page on which the figure is drawn. The scanner 400 has a chassis 402, which includes a side panel 405 having a connector opening 461 defined therein. The connector opening 461 is surrounded by a connector housing 460. The connector opening depicted is for a power supply connector, although it can also be a signal connector opening. The scanning apparatus 400 further includes a carriage locking device 450, which includes a locking arm 426 having a locking arm first end 425 which engages a locking receptacle 428 in the scanner carriage 410 when the locking arm is in a first position (shown) to thereby secure the scanner carriage in a relatively fixed position with respect to the chassis 402. The locking arm 426 is pivotally mounted within the chassis 402 by pivot pin 432. The locking device 450 further includes a locking arm actuator 422 which is movably supported within the connector opening 461. The actuator 422 has an actuator first end 423 which protrudes into the connector opening 461 when no connector is in the connector opening. The actuator 422 also has an actuator second end 427 which is in contact with a second end of the locking arm 426. When a connector is placed in the connector opening 461, the locking arm actuator 422 moves in direction "Y" and thus moves the locking arm 426 to a second position (indicated by 426A) to thereby disengage the scanner carriage 410. An actuator spring 442 maintains the actuator 422 in the carriage locking position when no connector is placed in the connector opening 461. A locking arm position spring 440 can also be provided to maintain the locking arm 426 in the locked position unless acted on by the actuator 422.

Turning to FIG. 13, another variation of a carriage locking device is depicted which is actuated when no connector is placed in the connector opening, to thereby secure the scanner carriage. FIG. 13 depicts a partial, side elevation, sectional view of an optical scanning apparatus 500. The scanner includes a chassis 502, a platen 504, and a scanner carriage 510. The chassis defines a side panel 505 having a connector opening 560 defined therein, which is depicted here as being configured to receive a power connection. The scanning apparatus 500 further includes a carriage locking device 590, which includes a locking pin 526 which is moveable from a first position (shown by dashed lines 526A) to a second position (indicated by solid lines). In the first position, the locking pin 526 engages the scanner carriage 510 via locking receptacle 528, and secures the scanner carriage in a relatively fixed position with respect to the chassis 502. In the second position the locking pin 526 disengages the scanner carriage 510, allowing the carriage to move within the chassis 502. The locking device 590 further includes an electrical actuator 522 (such as a solenoid), which is supported by bracket 523 and which can move the locking pin 526 from the first position (526A) to the second position. The actuator 522 is configured such that when it is energized, the locking pin 526 is in the retracted position (as shown), and thus in the absence of electrical power to energize the actuator 522, the locking pin 526 will be in the locked position (526A). The locking device 590 further includes a switch 530 which is in signal communication with the actuator 522 and a power supply 562. The switch 530 includes a contact 532 which is disposed within the connector opening 560, and which is switched when a connector is placed in the connector opening. Contact 532 thus closes switch 530 when a connector is placed in the opening 560, allowing the power supply to energize the actuator 522. When the actuator is energized, the locking pin 526 is moved to the second position (shown), freeing the carriage 310.

Turning now to FIG. 14, a variation on the locking device 590 of FIG. 13 is depicted. FIG. 14 depicts a partial, side elevation, sectional view of an optical scanning apparatus 600. Scanner 600 includes a chassis 602, a platen 604, and a scanner carriage 610. A connector opening 660 is defined in a side panel 605 of the chassis 602. The scanner 600 further includes scanner carriage locking device 690. As with the to locking device 590 of FIG. 13, locking device 690 of scanner 600 (FIG. 14) includes a locking pin 626 which is moveable from a first position (not shown) to a second position (shown). In the first position, the locking pin 626 engages the scanner carriage 610 via locking receptacle 628, and thus secures the scanner carriage in a relatively fixed position with respect to the chassis 602. In the second position (shown) the locking pin 626 disengages the scanner carriage 610, allowing the carriage to move within the chassis 602. The locking device 690 further includes an electrical actuator 622 (such as a solenoid), which is supported by bracket 623 and which can move the locking pin 626 from the first position to the second position. The actuator 622 is configured such that when it is energized by power supply 662, the locking pin 626 is in the retracted position (as shown), and thus in the absence of electrical power to energize the actuator 622, the locking pin 626 will be in the locked position. The locking device 690 further includes a processor 672 configured to detect the presence of a connector within the connector opening 660. This can be accomplished by providing a connector pin 632 which, when connected by a connector, provides a signal to be passed to the processor 672 via the circuit board 670. The processor 672 is further configured to cause the actuator 622 to move the locking pin 626 to the second position (shown) when the presence of a connector is detected within the connector opening 660.

While the above invention has been described in language more or less specific as to structural and methodical features, it is to be understood, however, that the invention is not limited to the specific features shown and described, since the embodiments herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An optical scanning apparatus comprising:
    a chassis having a panel, the panel having an opening defined there through;
    a scanner carriage moveably supported within the chassis;
    a carriage locking device comprising a locking member which is moveably disposed within the opening in the panel and, when moved in a downward direction within the opening, secures the scanner carriage in a relatively fixed position with respect to the chassis;
    the scanner carriage comprises a locking pin supported thereon; and
    the carriage locking device further comprises a locking bar supported on the locking member, the locking bar being shaped to engage the locking pin when the locking member is moved in the downward direction within the opening in the panel;
    the scanner carriage comprises a plurality of locking pins supported thereon; and
    the locking bar is shaped to engage the plurality of locking pins when the locking member is moved in the downward direction within the opening in the panel.

2. The optical scanning apparatus of claim 1, and wherein:
    the scanner carriage comprises a locking pin supported thereon; and
    the carriage locking device further comprises a locking lever pivotally supported by the chassis, the locking lever having a first end pivotally connected to the member, and a second end configured to engage the locking pin when the locking member is moved in the downward direction within the opening in the panel.

3. The optical scanning apparatus of claim 1, and further comprising a spring member in contact with the locking member, the spring member biasing the locking member in the downward direction.

4. The optical scanning apparatus of claim 1, and further comprising a weight supported on the locking member, the weight biasing the locking member in the downward direction.

5. The optical scanning apparatus of claim 1, and wherein the scanner carriage comprises a locking pin supported thereon which is engaged by the locking device when the locking member is moved in the downward direction within the opening in the panel.

6. The optical scanning apparatus of claim 5, and wherein the locking pin is wedge-shaped.

7. The optical scanning apparatus of claim 1, and wherein the locking member is an elongated shaft.

8. An optical scanning apparatus comprising:
    a chassis having a side panel, the side panel having a connector opening defined therein;
    a cover supported on the side panel and moveable from a first position wherein the connector opening is exposed, to a second position wherein the connector opening is covered;
    a scanner carriage moveably supported within the chassis; and
    a carriage locking device which is actuated by the cover and which secures the scanner carriage in a relatively fixed position with respect to the chassis when the cover is in the second position.

9. The optical scanning apparatus of claim 8, and wherein:
    the scanner carriage comprises a locking pin supported thereon; and
    the carriage locking device comprises a locking arm having a first end connected to the cover, and a second end shaped to engage the locking pin when the cover is in the second position.

10. The optical scanning apparatus of claim 9, and further wherein the cover is supported on the side panel by a hinge, and movement of the cover on the hinge causes the locking arm to rotate to selectively engage and disengage the locking pin.

11. The optical scanning apparatus of claim 8, and wherein the connector opening is one of an opening for a power connection or a signal cable connection.

12. The optical scanning apparatus of claim 8, and wherein:
    the connector opening is a power connector opening and the cover is a first cover, the side panel further having a signal cable connector opening defined therein;
    the apparatus further comprises a second cover supported on the side panel and moveable from a first position wherein the signal connector cable connector opening is exposed, to a second position wherein the signal cable connector opening is covered; and
    the carriage locking device is further actuated by the second cover to secure the scanner carriage in a relatively fixed position with respect to the chassis when the second cover is in the second position.

13. The optical scanning apparatus of claim 8, and wherein:
    the connector opening is a power connector opening and the cover is a first cover, the side panel further having a parallel port opening and a USB port opening defined therein;
    the apparatus further comprises:
    a second cover supported on the side panel and moveable from a first position wherein the parallel port opening is exposed, to a second position wherein the serial port opening is covered;
    a third cover supported on the side panel and moveable from a first position wherein the USB port opening is exposed, to a second position wherein the USB port opening is covered; and
    the carriage locking device is further actuated by the second and third covers to secure the scanner carriage in a relatively fixed position with respect to the chassis when both the second and third covers are in the second position.

14. The optical scanning apparatus of claim 13, and wherein:
the scanner carriage comprises a locking receptacle supported thereon;
the carriage locking device comprises a locking arm having a locking pin which is configured to be received within the locking receptacle, the locking arm further comprising a first and a second leg;
a first locking actuator which is actuated by the first cover and is movably positionable with respect to the first leg, to variably allow movement of the first leg, the first locking actuator being positioned to allow movement of the first leg when the first cover is in the first position;
a second locking actuator which actuated by either one of the second or third covers and is movably positionable with respect to the second leg, to variably allow movement of the second leg, the second first locking actuator being positioned to allow movement of the second leg when either one of the second or third first covers are in the first position; and
wherein, when movement of the first and second legs is allowed, the locking arm moves to retract the locking pin from the locking receptacle.

15. An optical scanning apparatus comprising:
a chassis having a side panel, the side panel having a connector opening defined therein;
a scanner carriage moveably supported within the chassis; and
a carriage locking device which is actuated when no connector is placed in the connector opening to thereby secure the scanner carriage in a relatively fixed position with respect to the chassis.

16. The optical scanning apparatus of claim 15, and wherein the locking device comprises:
a locking arm having a locking arm first end which engages the scanner carriage when the locking arm is in a first position to thereby secure the scanner carriage in a relatively fixed position with respect to the chassis; and
a locking arm actuator movably supported within the connector opening and having an actuator first end which protrudes into the connector opening when no connector is in the connector opening, and an actuator second end which is in contact with a second end of the locking arm, the locking arm actuator moving the locking arm to a second position to disengage the scanner carriage when a connector is in the connector opening.

17. The optical scanning apparatus of claim 15, and wherein the locking device comprises:
a locking pin which is moveable from a first position to engage the scanner carriage and secure the scanner carriage in a relatively fixed position with respect to the chassis, to a second position to disengage the scanner carriage;
an electrical actuator which can move the locking pin from the first position to the second position; and
a switch in signal communication with the actuator, and disposed within the connector opening, and which is switched when a connector is placed in the connector opening to cause the actuator to move the locking pin to the second position.

18. The optical scanning apparatus of claim 17, and wherein the electrical actuator is a solenoid.

19. The optical scanning apparatus of claim 15, and wherein the locking device comprises:
a locking pin which is moveable from a first position to engage the scanner carriage and secure the scanner carriage in a relatively fixed position with respect to the chassis, to a second position to disengage the scanner carriage;
an electrical actuator which can move the locking pin from the first position to the second position; and
a processor configured to detect the presence of a connector within the connector opening, the processor further configured to cause the actuator to move the locking pin to the second position when the presence of a connector is detected within the connector opening.

20. An optical scanning apparatus comprising
a chassis;
a scanner carriage moveably supported within the chassis; and
a passive scanner carriage locking device which is actuated when the chassis is put into a configuration which indicates that the chassis can be subjected to movement to thereby secure the scanner carriage in a relatively fixed position with respect to the chassis; wherein:
the chassis defines a connector opening; and
the passive scanner carriage locking device is actuated when no connector is inserted into the connector opening.

21. The optical scanning apparatus of claim 20, and wherein:
the scanning apparatus is configured to be supported on a support surface; and
the scanner carriage locking device is actuated by lifting the scanning apparatus away from the support.

22. The optical scanning apparatus of claim 20, and wherein the locking device comprises a connector cover which is supported on the chassis and is moveable from a first position wherein the connector opening can receive a connector, to a second position wherein the connector opening is covered, and when in the second position the locking device is actuated to secure the scanner carriage in the relatively fixed position with respect to the chassis.

23. The optical scanning apparatus of claim 20, and wherein the locking device comprises a detector configured to detect the absence of a connector within the connector opening, and when the absence of a connector within the connector opening is detected, to actuate the locking device to secure the scanner carriage in the relatively fixed position with respect to the chassis.

* * * * *